United States Patent [19]
Jones

[11] 4,029,058
[45] June 14, 1977

[54] STRATIFIED CHARGE ROTARY ENGINE WITH SIDE HOUSING FUEL INJECTION

[75] Inventor: Charles Jones, Hillsdale, N.J.

[73] Assignee: Curtiss-Wright Corporation, Wood-Ridge, N.J.

[22] Filed: Mar. 15, 1976

[21] Appl. No.: 666,792

[52] U.S. Cl. .................................... 123/8.09
[51] Int. Cl.² .................. F02B 53/10; F02B 53/12
[58] Field of Search ................ 123/8.09, 8.11, 8.13

[56] References Cited

UNITED STATES PATENTS

| | | | |
|---|---|---|---|
| 2,203,449 | 6/1940 | Tips ................................. | 123/8.09 |
| 3,196,852 | 7/1965 | Bentele .......................... | 123/8.09 |
| 3,310,042 | 3/1967 | Haas ................................ | 123/8.09 |
| 3,844,257 | 10/1974 | Currie et al. ..................... | 123/8.09 |
| 3,894,518 | 7/1975 | Gavrun et al. ................... | 123/8.09 |
| 3,967,592 | 7/1976 | Sasaki ............................. | 123/8.09 |

FOREIGN PATENTS OR APPLICATIONS

| | | | |
|---|---|---|---|
| 1,299,931 | 7/1969 | Germany .......................... | 123/8.13 |
| 1,817,099 | 9/1970 | Germany .......................... | 123/8.09 |
| 893,789 | 4/1962 | United Kingdom .............. | 123/8.11 |

Primary Examiner—John J. Vrablik
Attorney, Agent, or Firm—Victor D. Behn; Arthur Frederick

[57] ABSTRACT

A stratified charge rotary combustion engine having at least two fuel nozzles for discharging fuel into each working chamber after the charge therein has been substantially compressed, the fuel discharging from one nozzle being ignited as it discharges into an engine working chamber and the combustion flame produced by this ignition functioning as a pilot flame to ignite fuel discharging from a second nozzle mounted on a side wall of the engine housing.

5 Claims, 5 Drawing Figures

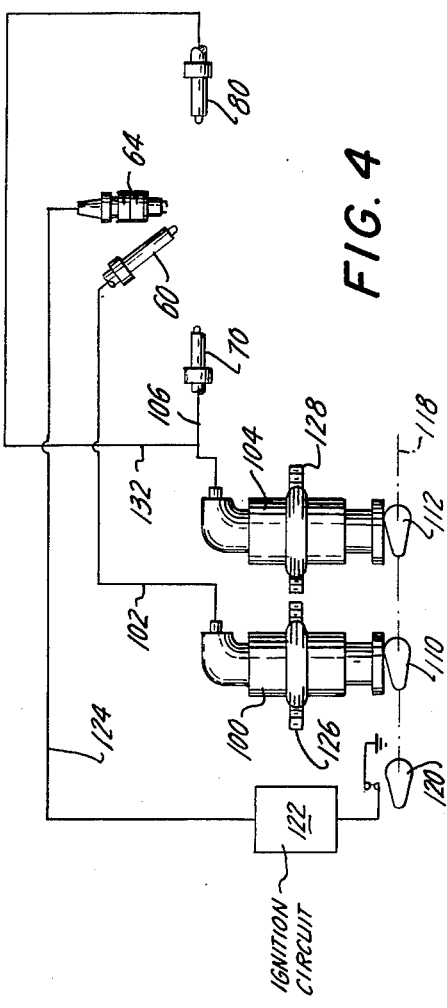
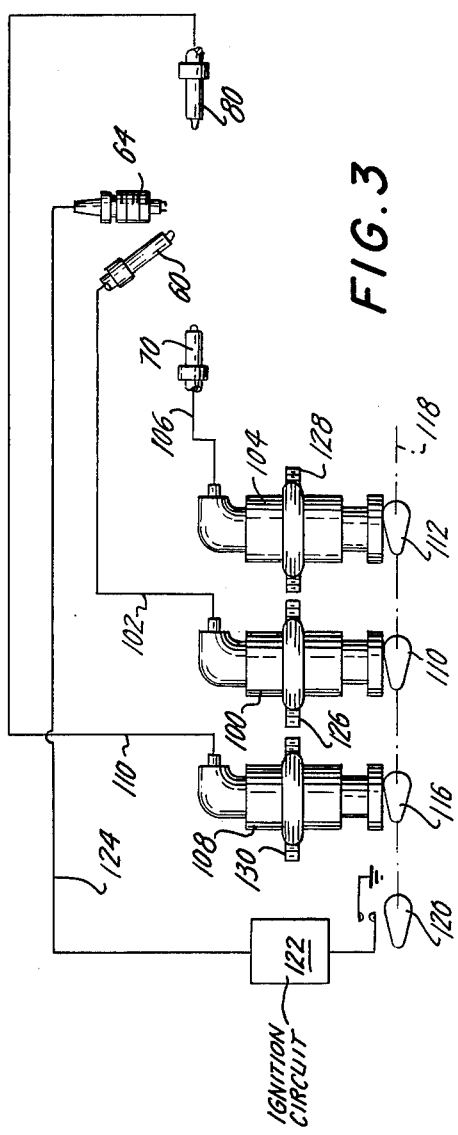
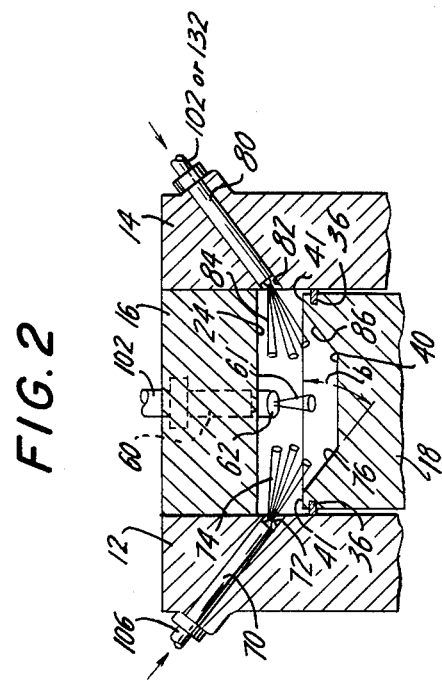
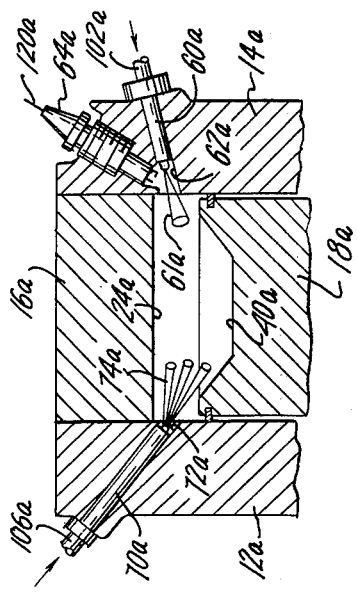

STRATIFIED CHARGE ROTARY ENGINE WITH SIDE HOUSING FUEL INJECTION

BACKGROUND OF THE INVENTION

The invention relates to rotary engines of the type shown in U.S. Pat. No. 2,988,065 granted June 13, 1961 to Wankel et al. and particularly to stratified charge rotary combustion engines having at least two high pressure fuel nozzles. U.S. Pat. No. 3,894,518 granted July 15, 1975 to Gavrun et al. discloses such a stratified charge rotary engine in which one of the fuel nozzles functions as a pilot flame for the other nozzle. The invention of this prior patent has been a distinct improvement over other prior stratified charge rotary engines. The construction of this prior patent has, however, presented the problem of locating at least two fuel nozzles and a spark plug in the rotor housing in the region of maximum heat flow into the rotor housing and maximum stress in the housing. This problem makes it difficult to adequately clamp the rotor housing to the engine side or end housings in the region of the fuel nozzles and spark plug as well as to adequately cool this region of the rotor housing and to avoid excessive thermal distortion of the rotor housing in this region.

SUMMARY OF THE INVENTION

It is an object of the present invention to provide a stratified charge, high-pressure fuel injection rotary engine having a plurality of fuel injection nozzles in which the aforementioned difficulties with such engines has been minimized.

In accordance with the invention, a rotary combustion engine is provided with at least one fuel nozzle in an end housing of the engine and an additional fuel nozzle is provided in the rotor housing or in the opposite end housing in combination with a spark plug so that this latter fuel nozzle functions as a pilot burner for the other fuel nozzle or nozzles. With this combination at most one fuel nozzle and spark plug is provided in the rotor housing thereby minimizing the above discussed problem with the construction of aforementioned U.S. Pat. No. 3,894,518.

Location of at least some of the fuel nozzles in the end housings rather than in the rotor housings has the further advantage in that the number of recesses in the rotor housing to accommodate the fuel nozzles is thereby reduced whereby the gas leakage across the apex seals is correspondingly reduced. In this connection it is pointed out that since the end housings are easier to cool, location of a fuel nozzle in an end housing rather than in the rotor housing minimizes the problem of fuel coking on the nozzle. Also, location of some of the fuel nozzles in the end housings rather than in the rotor housing has the additional advantage of making it possible to obtain better mixing of the air and fuel. This is particularly true because the fuel discharging from a nozzle in an end housing may have a longer path through the air charge in a working chamber. This means that more of the fuel is burnt before striking the rotor or another wall of the engine housing thereby insuring more complete combustion and less formation of carbon particles in the engine exhaust as well as less carbon formation on the rotor.

U.S. Pat. No. 3,174,466 (FIG. 15) granted Mar. 23, 1965 to Scherenberg; U.S. Pat. No. 3,196,852 (FIG. 8) granted July 27, 1965 to Bentele; U.S. Pat. No. 3,310,042 (FIGS. 9 and 10) granted Mar. 21, 1967 to Haas; and U.S. Pat. No. 3,359,950 (FIG. 7) granted Dec. 26, 1976 to DeCastelet, all disclose rotary combustion engines in which one or more fuel nozzles are mounted in the end housings of the engine. However, none of these patents disclose a rotary engine in which a spark plug is disposed immediately adjacent to one fuel nozzle with that fuel nozzle functioning as a pilot burner for another fuel nozzle. It is this latter feature of applicant's invention which makes the engine operable without detonation on low octane fuels such as kerosene or diesel engine fuels.

Other objects of the invention will be apparent upon reading the following detailed description in connection with the drawings.

BRIEF DESCRIPTION OF THE DRAWINGS

FIG. 2 is a sectional view taken along line 2—2 of FIG. 1;

FIG. 3 is a schematic view showing fuel regulating and ignition system for the engine of FIGS. 1 and 2;

FIG. 4 is a schematic view similar to FIG. 3 but showing a modified fuel and ignition system; and FIG. 5 is a view similar to FIG. 2 but illustrating a modification of the invention.

DESCRIPTION OF PREFERRED EMBODIMENTS

Figure 1:
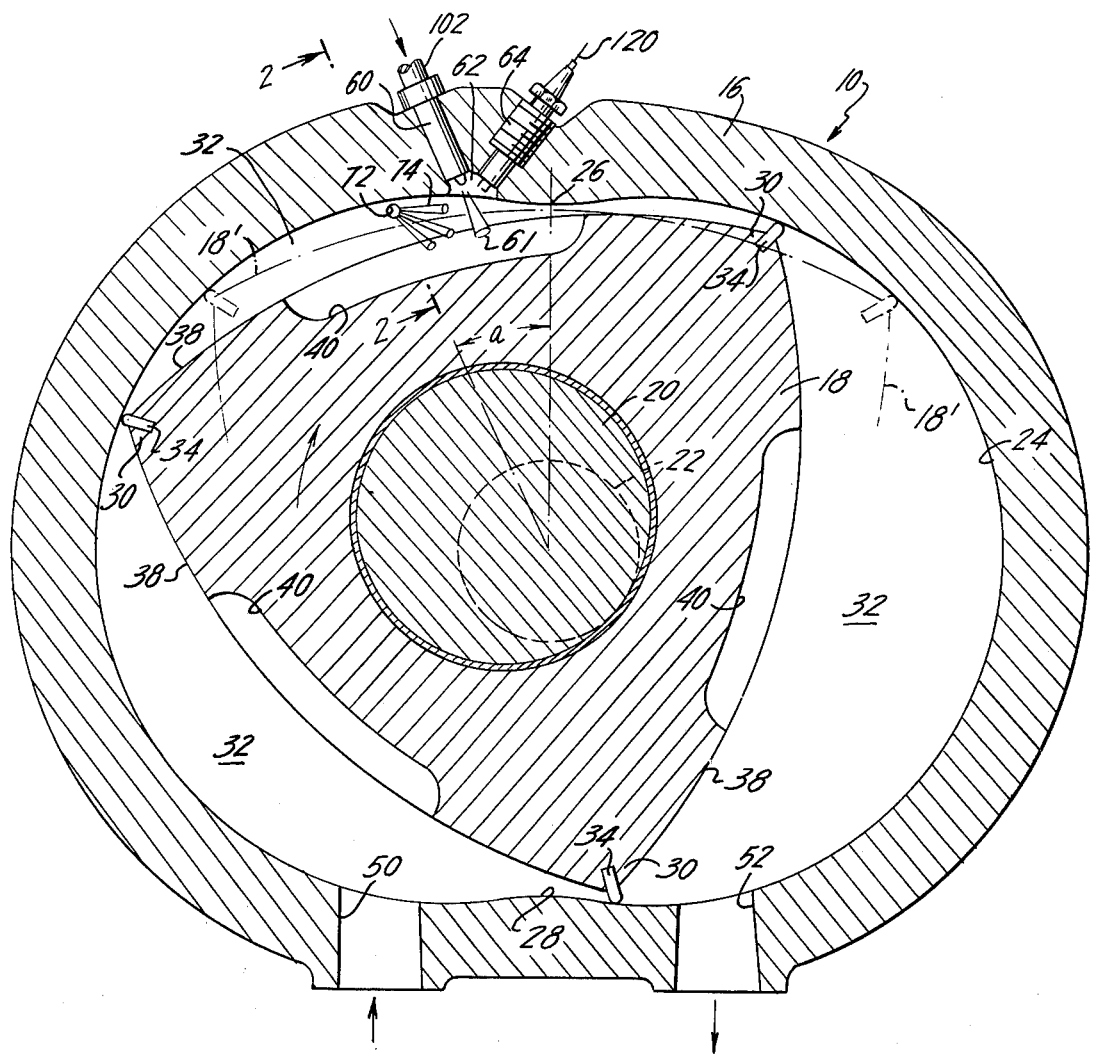
FIG. 1 is a schematic transverse sectional view of a rotary combustion engine embodying the invention.

Referring first to FIGS. 1 and 2 of the drawing, a rotary combustion engine is schematically indicated at 10, the general configuration of the engine being similar to the type disclosed in the aforementioned prior patents other than the patent to De Castelet. The engine 10 comprises an outer body or housing consisting of two axially-spaced end housings 12 and 14 and an intermediate or rotor housing 16, the housing being secured together to form the engine cavity therebetween. An inner body or rotor 18 is journaled for rotation within the housing cavity on an eccentric portion 20 of a shaft 22 which extends co-axially through and is supported by bearings (not shown) in the end housings 12 and 14. The axis of the shaft 22 is perpendicular to the inner walls of the end housings 12 and 14.

The peripheral inner surface 24 of the intermediate housing 16 is illustrated as having a two-lobe profile which preferably is basically an epitrochoid, said two lobes joining at junctions 26 and 28, these points being the closest points of the epitrochoid to the axis of the engine shaft 22. The line joining these two near-axis points 26 and 28 is generally called the minor axis of the epitrochoid.

The rotor 18 has a generally triangular profile with apex portions 30 having sealing cooperation with the trochoidal surface 24 to form three working chambers 32 between the rotor 18 and engine housing 12, 14, 16. For this purpose each of the rotor apex portions 30 is provided with a seal 34 which extends across the rotor between the inner walls of the end housings 12 and 14. Also, the rotor 18 has suitable seals 36 on its end faces for sealing contact with said inner walls of the end housings. The side seals 36 are located as close as possible to the working face 38 of the rotor. This is important so as to minimize the space between the rotor and engine side housings 12 and 14 radially outwardly of said side seals 36 since any burning combustion gases in this space are apt to be chilled by the adjacent walls to produce unburnt products in the engine exhaust. In addition, each of the three peripheral or working faces 38 of the rotor preferably is provided with a trough-like recess 40. Each recess 40 is elongate in the direction of rotor rotation and has its sides disposed parallel to but spaced from the end faces of the rotor preferably to leave only a narrow strip 41 of the rotor working face along each side of said recess.

The engine 10 also includes gearing (not shown) between the rotor and housing to control relative rotation of the rotor. Such gearing is conventional and preferably may be similar to that shown in the aforementioned prior patent to Wankel et al.

The engine 10 is provided with an air intake passage 50 for supplying air to the engine working chambers and is provided with an exhaust passage 52 through which the engine exhaust gases discharge. The engine intake passage 50 preferably is characterized by the absence of any air throttle valve. The intake and exhaust ports are disposed on opposite sides of the near-axis point 28. Combustion is initiated in each working chamber in the vicinity of the other near-axis point 26.

The engine structure so far described is conventional. During operation of the engine 10, with the rotor 18 rotating clockwise as indicated in FIG. 1, the volume of each working chamber 32 periodically increases from a minimum volume condition when it is located adjacent to the near-axis point 28 and is open to the intake port 50, to a maximum volume condition and closes to the intake port and then said chamber decreases in volume to compress its intake charge until the working chamber again reaches a minimum volume condition but this time at the other near-axis point 26. Thereafter, the volume of said chamber again expands to a maximum and then decreases to a minimum as the chamber comes into communication with the exhaust port 52 to complete the cycle.

As shown in FIG. 1, a first fuel nozzle 60 is mounted on the intermediate or rotor housing 16 adjacent to the near-axis point 26. Preferably, as illustrated, the fuel nozzle 60 is displaced from the near-axis point 26 in a direction opposite to that of rotor rotation and is arranged so that its fuel discharge spray into each working chamber is inclined toward the leading end of said chamber. However, it is within the scope of the invention to locate the fuel nozzle 60 on the other side of the near-axis point 26.

The fuel nozzle 60 has its fuel discharge end disposed in a recess 62 opening through the trochoidal surface 24 for discharging fuel into each working chamber 32 after the air intake charge within said chamber has been substantially compressed and combustion is about to be initiated. The nozzle 60 preferably has only a single orifice for discharging a single conical fuel spray pattern 61. A spark plug type igniter 64 is also mounted on the intermediate housing adjacent to the nozzle 60. The electrodes of the spark plug 64 are disposed within the recess 62 adjacent to the discharge end of the fuel nozzle 60 so that both the discharge end of the fuel nozzle 60 and spark plug electrodes are in communication with the engine working chambers 32 through this common recess 62. The fuel nozzle 60 and spark plug 64 are disposed so that at least a portion of the fuel vapor produced by the fuel discharge spray 61 from the nozzle passes in close proximity to the spark plug electrodes immediately as the fuel leaves the nozzle 60 for ready ignition by the spark plug. The timing of the spark from the spark plug 52 is such that it fires during the period of fuel discharge from the fuel nozzle 60 into a working chamber 32. In general, the physical arrangement of the fuel nozzle 60 and spark plug 64 is similar to the fuel nozzle in U.S. Pat. No. 3,246,636 granted Aug. 19, 1966 to Bentele, except that, in the Bentele patent all the engine fuel is supplied through a single fuel nozzle.

A second fuel nozzle 70 is mounted in the end housing 12 as seen in FIG. 2. The discharge end of the fuel nozzle 70 is disposed in a recess 72 which opens through the inner wall of the end housing 12 into communication with the engine working chambers 32. The nozzle 70 preferably has a wider discharge spray pattern than does the nozzle 60 and for this purpose may be a multi-orifice or shower-head type nozzle for discharging a plurality of conical sprays 74 therefrom. The nozzle 70 is disposed so that it can discharge fuel into each working chamber after the air charge therein has been substantially compressed and so that the fuel is ignited promptly or shortly after it discharges from the nozzle 70 by the burning fuel from the nozzle 60. Accordingly, the nozzle 70 must be disposed so that at full power engine operation fuel discharge can be initiated from this nozzle as early as, for example, when the rotor 18 is in its full line position of FIG. 1 and the fuel discharge can continue until the rotor is approximately at its top-dead-center position 18' (shown in dot-dash outline in FIG. 1). At lower engine powers the fuel discharge from the nozzle 70 can be initiated later and/or terminated earlier. When the rotor 18 is in its full line position of FIG. 1, it is approximately 60° before its top-dead-center position 18', this 60° being the angle of the shaft 22 before said top-dead-center position. In this latter connection it must be borne in mind that with a rotary engine of the type shown, the engine shaft 22 rotates three times as fast as the rotor 18.

Since the nozzle 70 is mounted on the end housing 12 it is subject to being periodically covered by the adjacent side of rotor 18 as the rotor rotates. Accordingly, the location of the side housing nozzle 70 and its recess 72 must be compatible with the time fuel discharge from the nozzle is to take place so as not to be covered by the adjacent side of the rotor at that time. As is apparent from FIG. 1, with the rotor 18 in its full line position (approximately 60° before its top-dead-center position) and with the periphery of the rotor being a maximum size for adequate compression ratio, there is little or no room on the side (downstream side) of the near-axis point 26, in the direction of rotor rotation, for the nozzle 70 to be there mounted in the side housing 12. In other words, if the side housing nozzle 70 and its recess 72 were placed on the downstream side of the near-axis point 26, the nozzle recess 72 would be largely covered by the adjacent side of the rotor at the time fuel discharge from said nozzle is to take place. This would also be true if the nozzle 70 and its recess 72 were placed on the upstream side of the near-axis point 26 but too close to said point. Applicant has found that if the nozzle recess 72 is placed in the housing end wall 12 as close as is practical to the trochoid surface 24 and is spaced in an upstream direction from the near-axis point 26 by an angle $a$ which, as measured about the axis of the shaft 22, is at least about 15° and is no greater than about 60°, then the nozzle 70 can discharge fuel into each working chamber throughout the desired angle range of the shaft 22, namely, between 0° and 60° (angle of the shaft 22) before the top-dead-center position (18') of the rotor. This 60° limit to angle $a$ assumes that fuel injection from the nozzle 70 is not to continue after the rotor reaches its top-dead-center position (18'). If, however, fuel injection is to continue beyond this top-dead-center position then this 60° limit to angle $a$ would have to be correspondingly reduced. Preferably, the angle $a$ locating the nozzle 70 is from 15° to 30°.

As illustrated in FIG. 1, the general direction of fuel discharge sprays 74 from the fuel nozzle 70 preferably is inclined toward the leading portion of the engine working chamber 32 into which said fuel is discharging so that a major portion of the fuel reaches said leading portion of the engine working chamber. This is important since because of rotation of the rotor 18 and because of inertia of the fuel, the fuel in each working chamber 32 tends to lag behind rotor rotation and therefore tends to gravitate toward the trailing portion of the working chamber and also because the speed of flame propagation in each working chamber 32 is substantially faster in the direction of rotor rotation than in the opposite direction. Also, as shown in FIG. 2 the general direction of the fuel discharged from the nozzle 70 is directed across each working chamber 32 so as to spread the fuel across said chamber. It is apparent, therefore, from FIGS. 1 and 2 that the axis of the fuel discharge spray pattern from the nozzle 70 is inclined toward the leading portion of each working chamber 32 and is inclined across said chamber.

It is desirable that a major portion of the combustion in each working chamber 32 takes place in its rotor recess 40 so as to minimize contact of the burning gases with the relatively cool walls of the engine housing. For this purpose the side 76 of each rotor recess adjacent to the end housing 12 in which the nozzle 70 is mounted is inclined to the rotor working face 38 by an angle (angle $b$ in FIG. 2) no greater than about 45° so that at least a portion of the fuel discharge spray from the nozzle 70 can be directed into said recess, as shown in FIG. 2. As previously described, the fuel discharge recess 72 in the end housing 12 is placed close to the trochoid surface 24. As is evident from FIG. 2 this also helps to make it possible for the nozzle 70 to direct a portion of its fuel directly into each working chamber recess 40 from the end housing 12.

As illustrated, the fuel nozzles 60 and 70 are so orientated that at least a portion of the fuel discharged from the nozzle 70 is directed into generally the same region of each working chamber as the fuel discharged from the nozzle 60. As a result, the ignited fuel discharging from the nozzle 60 can function as a pilot flame for igniting the fuel discharging from the nozzle 70. Separate pumps driven by the engine may be provided to supply fuel to the nozzles 60 and 70 so that the quantity of fuel discharged by these nozzles can be independently controlled as hereinafter described.

The other end housing 14 preferably is also provided with a fuel nozzle 80 mounted therein opposite to the fuel nozzle 70, for discharging fuel through a recess 82 in the inner wall of said end housing. The location of this nozzle 80 and its recess 82 in the end wall of the end housing 14 is subject to the same restrictions discussed in connection with the nozzle 70 and its recess 72. That is, the recess 82 for the nozzle 80 should be located close to the trochoid surface 24 and no closer than approximately the angle $a$ in FIG. 1 to the near-axis point 26 of said trochoid. Like the nozzle 70, this third nozzle 80 preferably has a wide spray pattern and for this purpose may be a multi-orifice or shower-head type of nozzle, with the nozzle 80 and its recess 82 being located directly opposite to the nozzle 70 and its recess 72. Also, the general direction of the fuel discharge spray pattern from the nozzle 80 preferably is inclined toward the leading end of and across each working chamber 32 similar to the orientation of the fuel discharge spray pattern from the nozzle 70.

When a fuel nozzle such as the nozzle 80 is provided in the housing end wall 14, the side 86 of each rotor recess 40 adjacent to said end wall is preferably inclined to the rotor surface 38 in a manner similar to inclination already described for the other side 76 of said recess 40. With this construction a major portion of the fuel from both nozzles 70 and 80 can be directed directly into each rotor recess 40. It is, however, within the scope of the invention to reduce the size of each combustion recess 40 from that illustrated in FIGS. 1 and 2 and even to flatten each rotor face so as to eliminate the recesses 40.

FIG. 3 discloses a fuel pump and ignition system for the engine configuration of FIGS. 1 and 2. As there shown, a fuel pump 100 is provided for supplying fuel to the pilot nozzle 60 through the passage connection 102. A fuel pump 104 is provided for supplying fuel to the second nozzle 70 through the passage connection 106. In addition, a third fuel pump 108 is provided for supplying fuel to the third fuel nozzle 80 through a passage connection 110. The fuel pumps 100, 104 and 108 are designed for actuation by cams 112, 114 and 116 respectively, these cams being driven from the engine shaft by means schematically indicated at 118. A fourth engine driven cam 120 is provided for controlling the ignition circuit schematically indicated at 122, this circuit being connected to the spark plug 64 by the wire 124. The pumps 100, 104 and 108 are provided with control racks 126, 128 and 130 respectively for regulating the quantity and timing the fuel supplied by each pump to each engine working chamber 32 as is conventional in such pumps. In this latter connection, attention is directed to the aforementioned patent to Gavrun et al. and to copending application, Ser. No. 512,342 filed Oct. 4, 1974 in the name of Lamping et al. by applicants' assignee for a pump construction in which means are provided for determining the quantity and timing of its fuel discharge. The specific details of each of the pumps 100, 104 and 108 and of the ignition circuit 122 form no part of the present invention and, for example, may be similar to that shown in the aforementioned patent to Gavrun et al.

With the fuel supply and ignition system of FIG. 3, each fuel nozzle, 60, 70 and 80 has its own fuel pump 100, 104 and 108 respectively and therefore the quantity and timing of the fuel discharge from each fuel nozzle is determined by its pump. For example, the pump 108 for the third nozzle 80 may be configured to supply fuel into each working chamber 32 only during a high power portion of the range of engine power output whereby at lower powers only the nozzles 60 and 70 would supply fuel to the engine working chambers. It is however within the scope of the invention to connect the fuel nozzles 70 and 80 in parallel to the same pump so that, for example, they discharge equal amounts of fuel into each working chamber 32 over the same period of time. Such an arrangement is illustrated in FIG. 4.

FIG. 4 is similar to FIG. 3 except that the pump 108 has been eliminated and the pump 104 not only supplies fuel to the nozzle 70 through the passage 106 but now also supplies fuel to the nozzle 80 through the parallel passage 132.

It is important that during low power operation the entire fuel should not be spread too much across each working chamber particularly because the engine is designed for operation without any throttle valve in the air intake, the engine power being controlled by regulating the fuel flow. As a result, the overall or average fuel-air ratio of the charge in each working chamber is extremely lean particularly at low engine powers and, therefore, if the nozzle 60 dispersed its fuel too much across each working chamber the mixture at the spark plug would be too lean for ignition by the plug. For this reason, the nozzle 60 preferably is a single orifice nozzle. On the other hand in order to insure adequate mixing of the fuel with the air in each working chamber particularly at higher engine powers, the nozzles 70 and 80 are designed to have a relatively wide fuel discharge spray pattern so as to spread their fuel discharges across each working chamber.

It is within the scope of the invention to simplify the engine by using but two fuel nozzles 60 and 70. The fuel pump and ignition circuit arrangement of FIG. 4 could then be used simply by eliminating the nozzle 80 and its passage connection 132. Where only two fuel nozzles are used, the pilot nozzle could be mounted either in the engine rotor housing 16, as in FIGS. 1 and 2, or in the rotor side housing 14. FIG. 5 illustrates such a modification. For ease of understanding, the parts of FIG. 5 have been designated by the same reference numerals as the corresponding parts of FIGS. 1 and 2 but with a subscript $a$ added thereto.

In FIG. 5, only two fuel nozzles are provided, the pilot nozzle 60$a$ and the nozzle 70$a$. The pilot nozzle 60$a$ and its spark plug 64$a$ are both mounted in the end housing 14$a$ opposite the nozzle 70$a$ rather than in the rotor housing 16$a$. The fuel sprays 61$a$ and 74$a$ from the nozzles 60$a$ and 70$a$ preferably are directed so as to be inclined toward the leading end of and across each working chamber similar to the orientation of the fuel sprays from the nozzles 70 and 80 of FIGS. 1–2. The nozzles 60$a$ and 70$a$ preferably are supplied with fuel by pumps such as the pumps 100 and 104 of FIGS. 3 and 4 for the nozzles 60 and 70. The operation of FIG. 5 is thus similar to that of FIGS. 1–2 without the third nozzle 80.

Where, as in FIGS. 1 and 2, the pilot nozzle 60 is mounted in the rotor housing, it may, as already noted, be positioned on either side of the near-axis point 26 and its position is in no way restricted by the angle $a$ as is the nozzle 70. Where, however, as in FIG. 5, the pilot nozzle 60$a$ is positioned in the end wall 60$a$ opposite to the nozzle 70, the location of its fuel discharge recess 62$a$ is subject to the same restrictions discussed for the location of the fuel discharge recess 72 of the nozzle 70. That is, the recess 62$a$ for the nozzle 60$a$ should be located close to the trochoid surface 24$a$ and no closer than approximately the angle $a$ to the near-axis point 26 of said trochoid. Location of the pilot nozzle 60$a$ in the end housing 14 rather than in the rotor housing, however, has the advantage of eliminating a recess, such as the recess 62, in the trochoid surface 24 of the rotor housing. Elimination of this rotor housing recess eliminates leakage of combustion gases through this recess each time it is traversed by an apex seal. It is also noted that the spark plug could be located on any side of its pilot nozzle rather than on the particular side illustrated.

It should be understood that the invention is not limited to the specific details of construction and arrangement thereof herein illustrated and that changes and modifications may occur to one skilled in the art without departing from the spirit or scope of the invention.

I claim:
1. A rotary combustion engine comprising:
   a. an outer body having a pair of end walls and an intermediate peripheral wall to define an internal cavity, the inner peripheral surface of said intermediate wall having a multi-lobe profile;
   b. an inner body of generally polygonal profile mounted for relative rotation within said outer body, the apex portions of said inner body having sealing cooperation with said multi-lobe peripheral surface to define a plurality of working chambers which vary in volume in response to said relative rotation;
   c. a first fuel nozzle mounted on said outer body for discharging fuel into each working chamber after the air therein has been substantially compressed;
   d. an igniter mounted on said outer body adjacent to said first fuel nozzle for igniting fuel promptly as it discharges from said first nozzle; and
   e. a second fuel nozzle mounted on an end wall of said outer body for discharging additional fuel into each working chamber also after the air charge therein has been substantially compressed, said second nozzle having its discharge end disposed close to the multi-lobe inner peripheral surface of the intermediate wall at a point on its end wall which is spaced from the adjacent lobe junction in a direction opposite to the direction of rotation of the inner body such that the angle subtended about the engine axis by the distance between said second nozzle and the adjacent lobe junction is at least about 15° but is no greater than about 60°, said second nozzle being arranged to discharge its fuel into each working chamber in a direction inclined to the direction of rotation of the inner body so as to discharge generally across and toward the leading end of said chamber with at least a portion of its fuel being discharged in generally the same region as the fuel discharge from the first nozzle so that the ignited fuel discharged by the first nozzle functions as a pilot flame for promptly igniting the fuel as it discharges from the second nozzle.

2. A rotary combustion engine as recited in claim 1 in which each working face of the inner body extending between a pair of adjacent apex portions has a recess which is elongated in the direction of rotation of the inner body, the sides of said recess being disposed close to but spaced from the end faces of the inner body and the side wall of this recess adjacent to the end wall for the second fuel nozzle being inclined at an angle no greater than about 45° to the outer periphery of the adjacent end face of the inner body such that a portion of the fuel discharged from said second nozzle may be directed into the recess in a direction substantially parallel to said adjacent side wall of the recess.

3. A rotary combustion engine as claimed in claim 1 in which said first fuel nozzle is mounted on the end wall of the outer body opposite to the end wall on which said second nozzle is mounted for discharging its fuel through a recess in its end wall and in which said igniter is also mounted on said latter end wall with its electrode end being disposed in said recess and in which the recess for said first fuel nozzle and its igniter is disposed close to the multi-lobe inner peripheral surface of the intermediate wall and at a point on its end wall which is spaced from the adjacent lobe junction in a direction opposite to the direction of rotation of the inner body such that said first fuel nozzle is so spaced from the adjacent lobe junction that the angle subtended about the engine axis by the distance between said nozzle and the adjacent lobe junction is at least about 15° but no greater than 60° and further in which said first fuel nozzle is arranged to discharge its fuel into each working chamber in a direction generally across and toward the leading end of said chamber.

4. A rotary combustion engine as claimed in claim 1 and including a third fuel nozzle mounted on the end wall of the outer body opposite to the end wall on which said second nozzle is mounted, said third nozzle having its discharge end disposed close to the multi-lobe inner peripheral surface of the intermediate wall at a point on its end wall which is spaced from the adjacent lobe junction opposite to the direction of rotation of the inner body such that the angle subtended about the engine axis by the distance between said third nozzle and the adjacent lobe junction is at least about 15° but is no greater than about 60°; said third nozzle being arranged to discharge its fuel into each working chamber in a direction inclined to the direction of rotation of the inner body such that its fuel is discharged generally across and toward the leading end of said chamber.

5. A rotary combustion engine as claimed in claim 4 in which said first nozzle is mounted on said intermediate peripheral wall generally between said second and third nozzles with said first nozzle discharging its fuel through a recess in the multi-lobe peripheral surface of said intermediate wall and in which said igniter is also mounted on said intermediate wall with its electrode end disposed in said recess.

* * * * *